United States Patent
Nakajima

(10) Patent No.: US 9,830,178 B2
(45) Date of Patent: Nov. 28, 2017

(54) DYNAMIC REASSIGNMENT FOR MULTI-OPERATING SYSTEM DEVICES

(71) Applicant: Intel Corporation, Santa Clara, CA (US)

(72) Inventor: Jun Nakajima, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/198,685

(22) Filed: Mar. 6, 2014

(65) Prior Publication Data
US 2015/0254086 A1    Sep. 10, 2015

(51) Int. Cl.
*G06F 9/455* (2006.01)
*G06F 9/48* (2006.01)

(52) U.S. Cl.
CPC ........ *G06F 9/45533* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 5,095,427 A * | 3/1992 | Tanaka | G06F 9/4843 718/1 |
| 2008/0216096 A1 | 9/2008 | Wang | |
| 2009/0037649 A1 | 2/2009 | Xu | |
| 2009/0158299 A1 * | 6/2009 | Carter | 719/319 |
| 2010/0162242 A1 * | 6/2010 | Grouzdev | 718/1 |
| 2011/0202918 A1 * | 8/2011 | Park et al. | 718/1 |
| 2011/0271088 A1 | 11/2011 | Princen et al. | |

(Continued)

FOREIGN PATENT DOCUMENTS

| | | | |
|---|---|---|---|
| JP | 2000-242512 A | 9/2000 | |
| JP | 2001-256066 A | 9/2001 | |

(Continued)

OTHER PUBLICATIONS

International Search Report and Written Opinion received for PCT Application No. PCT/US2015/018738, dated May 22, 2015, 11 pages.

(Continued)

*Primary Examiner* — Tuan Dao
*Assistant Examiner* — William C Wood
(74) *Attorney, Agent, or Firm* — Grossman, Tucker, Perreault & Pfleger, PLLC

(57) ABSTRACT

The present application is directed to dynamic reassignment for multi-OS devices. An example device may comprise equipment, at least two operating systems, a kernel for each OS to provide an interface between the OS and the equipment and a virtual machine manager (VMM). OS selection agents in each OS may interact with a kernel mode controller (KMC) in the VMM. For example, the OS selection agent may transmit a message instructing the KMC to transition the foreground OS to the background and transition a background OS to the foreground. The KMC may transmit signals to the kernels of the foreground and background operating systems causing at least one driver in the foreground OS kernel to save a current equipment state and release control over the equipment while also causing at least one driver in the background OS kernel to restore an equipment state and to take control over the equipment.

15 Claims, 4 Drawing Sheets

(56) References Cited

U.S. PATENT DOCUMENTS

2012/0303947 A1 11/2012 Durham
2013/0061250 A1 3/2013 Kothandapani et al.

FOREIGN PATENT DOCUMENTS

JP 2010-072703 A 4/2010
JP 2012-252570 A 12/2012
KR 10-2011-0094764 A 8/2011

OTHER PUBLICATIONS

International Preliminary Report on Patentability issued in PCT Application No. PCT/US2015/018738, dated Sep. 15, 2016, 8 pages.
Korean Office Action issued in Korean Application No. 10-2016-7020749, dated May 16, 2017, with English Summary and machine translation, 16 pages.
Japanese Office Action issued in Japanese Application No. 2016-550257, dated Sep. 28, 2017, with English translation, 18 pages.
Takehiro Nakayama, Ken Ota, Atsushi Takeshita: "OSTI Technology for Open and Secure Mobile Terminals", a NTTDoCoMo technical journal, the Telecommunications Association, Apr. 1, 2007, vol. 9, No. 1, pp. 57-61.

* cited by examiner

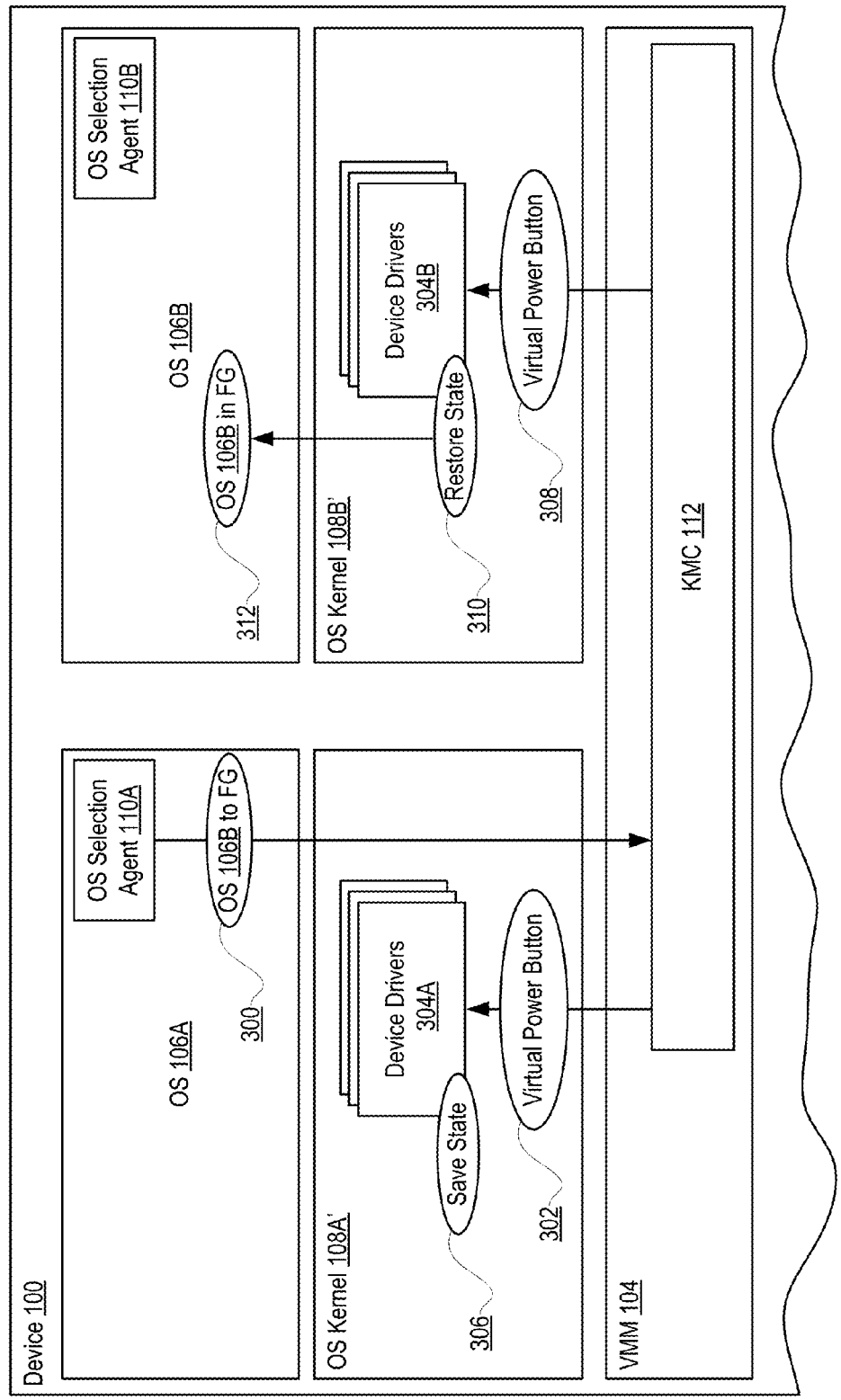

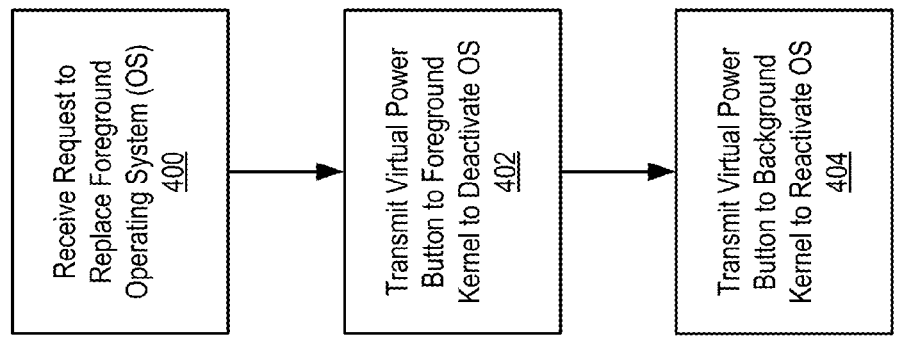

DYNAMIC REASSIGNMENT FOR MULTI-OPERATING SYSTEM DEVICES

TECHNICAL FIELD

The present disclosure relates to electronic devices, and more particularly, to a device able to quickly move between different operating systems without having to reboot the device.

BACKGROUND

A device may comprise an operating system (OS) to facilitate the operation of equipment in the device. For example, an OS may comprise various drivers for the equipment, file handling and processing utilities, user interface software that may facilitate user interaction with a device, etc. Devices have traditionally only comprised one OS as this is all that is needed for the device to function. However, the introduction of a variety of different types of operating systems from a variety of sources has generated interest in multi-operating system devices. For example, a user of a mobile computing device may desire to employ a more robust OS when the device is being used in a stationary manner (e.g., with external power and a wired network), and may switch to an OS that is more streamlined, power efficient, etc. when the device is mobile. In this manner, the user may leverage all of the abilities of the device in completely different operational scenarios.

While employing more than one OS in a device may be beneficial on its face, the actual implementation of such a system is currently problematic. Existing solutions do not allow for transitioning from one OS to another in an expedient manner. These solutions may require, for example, a device to be rebooted to change from one OS to another, to completely suspend the activity of one OS when moving to another, etc. As a result, the user is presented with delays and/or undesirable limitations that make the use of more than one OS burdensome. It may also be possible for an instance of one operating system to run virtually within another OS, thereby allowing more than one OS to be concurrently active in a device. While such a solution may provide the flexibility to quickly move between different operating systems, the processing and power resources needed to implement this solution so that all operating systems perform in an acceptable manner does not make it appropriate for certain implementations wherein processing power and/or battery life are a concern (e.g., mobile communication and/or computing devices).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3 illustrates an example of dynamic reassignment in accordance with at least one embodiment of the present disclosure; and FIG. 4 illustrates example operations for dynamic reassignment for multi-OS devices in accordance with at least one embodiment of the present disclosure.

Figure 1:
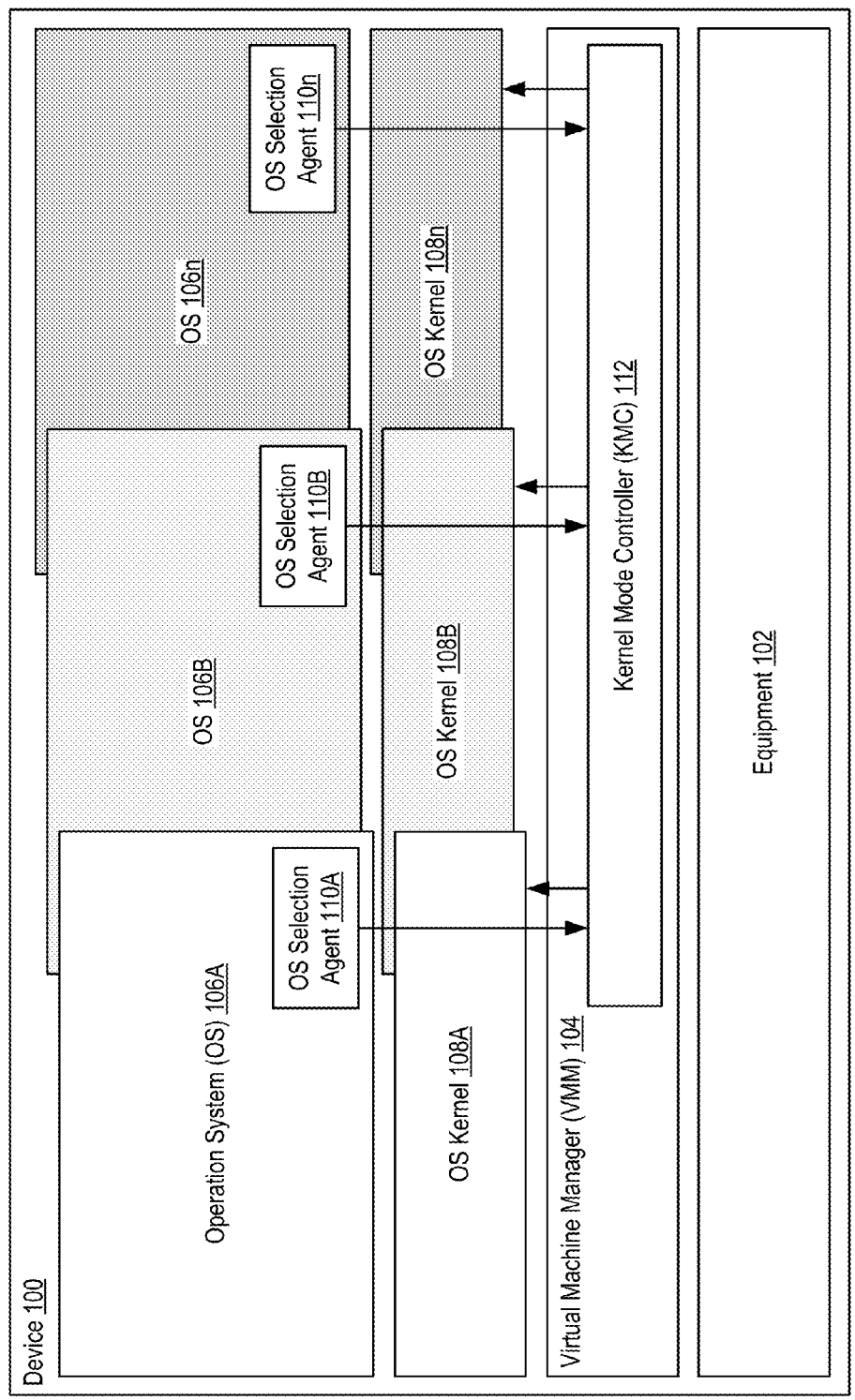
FIG. 1 illustrates an example device configured for dynamic reassignment for multi-OS devices in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to dynamic reassignment for multi-OS devices. In one embodiment, a device may comprise, for example, equipment for supporting device operation, at least two operating systems, a kernel for each OS to provide an interface between the OS and the equipment and a virtual machine manager (VMM). OS selection agents in each OS may further interact with a kernel mode controller (KMC) in the VMM. In an example of operation, an OS selection agent in a foreground OS may receive an instruction to move a background OS to the foreground. The OS selection agent then may transmit a message to the KMC instructing that the foreground OS should transition to the background and a background OS should transition to the foreground. The KMC may send signals (e.g., virtual power button signals) to the kernels of the foreground and background operating systems to initiate the change. The signals may, for example, cause at least one driver in the foreground OS kernel to save a current equipment state and release control over the equipment while also causing at least one driver in the background OS kernel to restore a saved equipment state and to control the equipment. The foreground OS may then continue running in the background while the background OS moves to the foreground.

In one embodiment, a multi-OS device may comprise, for example, equipment to support operations in the device, at least two operating systems, kernels corresponding to each of the at least two operating systems and a VMM. The at least two operating systems may each include an OS selection agent. The kernels may be to facilitate interaction between the equipment and the at least two operating systems. The VMM may comprise at least a KMC to control an operational state of at least one of the at least two operating systems based on an instruction received from an OS selection agent.

In one embodiment, the at least two operating systems comprise at least a foreground OS and a background OS loaded in the device. At least one OS selection agent may be to sense a trigger to change the foreground operating system, the trigger being generated by at least one of an event, a command, a hardware-based user interface or a software-based user interface. The at least one OS selection agent may further be to transmit an instruction to at least the KMC to cause the foreground OS to transition to the background and background OS to transition to the foreground. The KMC being to control the operational state comprises the KMC being to transmit a signal to at least one kernel. The signal may be, for example, a virtual power button signal.

In the same or a different embodiment, the kernel corresponding to the foreground OS may comprise at least one driver, the kernel corresponding to the foreground OS being to, upon receiving the signal, cause the at least one driver to save a current equipment state and to release control over the equipment. The kernel corresponding to the foreground OS may further be to cause the foreground OS to remain active in the background. The kernel corresponding to the background OS may comprise at least one driver, the kernel corresponding to the background OS being to, upon receiving the signal, cause the at least one driver to restore a saved equipment state and to control the equipment. The kernel corresponding to the background OS may further be to cause the background operating system to move to the foreground. In one embodiment, at least one kernel may comprise a driver shared by the at least two operating systems for accessing the equipment. An example method for moving between multiple operating systems on a device consistent with the present disclosure may comprise receiving a request to transition from a foreground OS to a background OS in a VMM comprising at least a KMC, transmitting a signal from the KMC to a kernel corresponding to the foreground OS to cause the foreground operating system to deactivate and transmitting a signal from the KMC to a kernel corresponding to the foreground OS to cause the background operating system to activate.

FIG. 1 illustrates an example device 100 configured for dynamic reassignment for multi-OS devices in accordance with at least one embodiment of the present disclosure. Examples of device 100 may comprise, but are not limited to, a mobile communication device such as a cellular handset or a smartphone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Device 100 may comprise, for example, equipment 102, VMM 104, a plurality of operating systems such as OS 106A, OS 106B . . . OS 106n (collectively, "OS 106A . . . n) and a kernel corresponding to each of the plurality of operating systems such as kernel 108A corresponding to OS 106A, kernel 108B corresponding to OS 106B . . . kernel 108n corresponding to OS 106n (collectively, "kernel 108A . . . n"). While three (3) operating systems 106A . . . n are illustrated in device 100, embodiments consistent with the present disclosure are not limited to only three operating systems and may include, for example, only two operating systems or more than three operating systems depending on, for example, the capabilities of device 100.

Equipment 102 may comprise, for example, hardware in device 100, or at least coupled to device 100, that may support, facilitate, etc. various functionality. Some equipment 102 may be more problematic when attempting to switch between OS 106A . . . n. For example, latency-sensitive and/or performance-intensive equipment 102 may be resistant to switching between OS 106A . . . n. In particular, the detachment, delay, reengagement, etc. caused by existing multi-OS switching solutions may cause latency-sensitive and/or performance-intensive equipment 102 to malfunction, to cause a malfunction elsewhere in device 100, etc. Examples of latency-sensitive equipment 102 that may reside in, or may be coupled to, device 100 may include, but are not limited to, communication interfaces, memory interfaces, touch controllers, sensors, etc. Examples of performance-intensive equipment 102 that may reside in, or may be coupled to, device 100 may include, but are not limited to, user interface (UI) apparatuses such as graphics controllers, media processing engines, audio/video capture equipment, etc.

OS 106A . . . n may comprise collections of software that may be configured to manage the operation of equipment 102 in device 100. OS 106A . . . n may be manufactured by a company for sale, may be compiled by a user community (e.g., "open-source") for free use, or may be hybrids of the private/public models. Examples of OS 106A . . . n may include, but are not limited to, Disk Operating System (DOS) by the Microsoft Corporation, Windows, IOs, Android, Unix OS from the Open Group, Linux OS from the Linux Foundation (e.g., including a variety of both public and for-profit distributions), Jolicloud OS from Jolicloud, etc. OS 106A . . . n may be associated with kernel 108A . . . n. Kernel 108A . . . n comprise software resources that may act as an interface between OS 106A . . . n and equipment 102. Each kernel 108A . . . n may comprise at least one driver for operating equipment 102. During normal operation for device 100, OS 106A . . . n may make system calls to access various hardware resources in equipment 102. Kernel 108A . . . n may manage these calls and allocate the calls to the appropriate hardware within equipment 102.

Device 100 VMM 104 may be "virtualized" in that at least one virtual machine (VM) may operate within device 100. A VM may be a software-based emulation of device hardware. Virtualization may be beneficial in that more than one VM may be able to operate on a single hardware platform. Moreover, virtualization may standardize the interface over which an OS may access resources on a device, and thus, eliminates having to customize the interface over which an OS will access device hardware based on the particular device. Virtualization may further allow software to operate when physical hardware may not be available and also to be isolated from other software in a device so that a software crash in one VM does not impact the entirety of device operation. In one embodiment, VMM 104 may manage the operation of at least one VM running on device 100. VMM 104 may help to maintain stability and security in device 100 by managing access to hardware resources. VMM 104 operates at a higher level of security than an OS 106A . . . n in device 100, and thus, may not be vulnerable to any malicious software (e.g., malware) that may be operating in OS 106A . . . n.

In one embodiment, OS 106A may comprise OS selection agent 110A, OS 106B may comprise OS selection agent 110B . . . OS 106n may comprise selection agent 110n (collectively, "OS selection agent 110A . . . n"). OS selection agent 110A . . . n may be programs that run in the background of OS 106A . . . n to sense triggers to change which OS 106A . . . n is in the foreground. In one embodiment, OS selection agent 110A . . . n may comprise a "wake lock" such as exists in the Android OS to prevent OS selection agent 110A . . . n from being placed into an S3 sleep state (e.g., totally inactive state) when the particular OS 106A . . . n is operating in the background. For example, a trigger may be generated by an event, command or interaction with a hardware-based or software-based user interface in device 100. For example, a user may desire to replace a foreground OS (e.g., an OS 106A . . . n with which the user may interact) with a background OS (e.g., another OS 106A . . . n that is not currently in the foreground), and may proceed to interact with a hardware-based or software-based button to cause the change. It may also be possible to generate an event or command to automatically cause the foreground OS to be changed.

At least one OS selection agent 110A . . . n may transmit a message to KMC 112 in VMM 104. It is important to note that VMM 104 merely provides an appropriate location for KMC 112 to reside (e.g., an accessible location with an appropriate level of security), and that KMC 112 may reside in other locations within device 100 consistent with the present disclosure. KMC 112 may be to control the state of at least one OS 106A . . . n by transmitting a signal to a kernel 108A . . . n corresponding to a foreground OS and background OS. In one embodiment, the signal may be a "virtual power button" signal that substantially imitates the action of a powering down device 100. The virtual power button signal may emulate a standard power button, or in one embodiment, may be customized to cause certain behavior associated with transitioning OS 106A . . . n. These signals may cause a kernel 108A . . . n corresponding to the foreground OS and background OS to perform various activities that allow the foreground OS to continue running in the background and the background OS to move to the foreground. These activities may include changing the operational state of at least one driver in the kernel 108A . . . n so that the foreground OS may relinquish control over equipment 102 to the background OS moving to the foreground. A more specific example of these activities will be discussed further with respect to FIG. 3.

Figure 2:
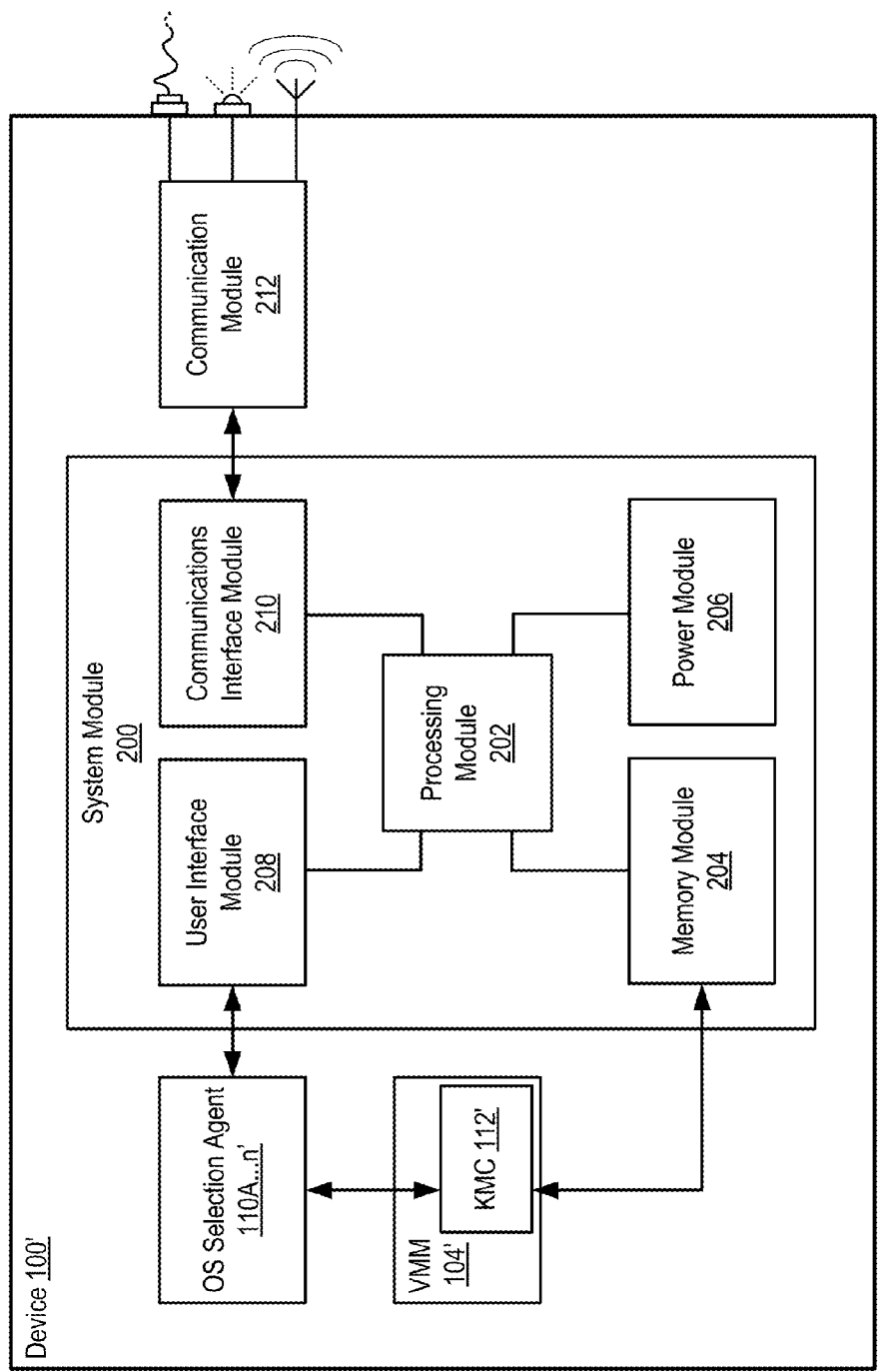
FIG. 2 illustrates an example configuration for a device usable in accordance with at least one embodiment of the present disclosure.

FIG. 2 illustrates an example configuration for device 100' usable in accordance with at least one embodiment of the present disclosure. In particular, device 100' may be capable of performing example functionality such as disclosed in FIG. 1. However, device 100' is meant only as an example apparatus usable in embodiments consistent with the present disclosure, and is not meant to limit these various embodiments to any particular manner of implementation.

Device 100' may comprise, for example, system module 200 configured to manage device operations. System module 200 may include, for example, processing module 202, memory module 204, power module 206, user interface module 208 and communication interface module 210. Device 100' may also include communication module 212, VMM 104' and OS selection agent 110A . . . n'. While communication module 212, VMM 104' and OS selection agent 110A . . . n' have been illustrated as separate from system module 200, the example implementation shown in FIG. 2 has been provided merely for the sake of explanation. Some or all of the functionality associated with communication module 212, VMM 104' and OS selection agent 110A . . . n' may be incorporated in system module 200.

In device 100', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory modules configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply device 100' with the power needed to operate. User interface module 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 208 may be incorporated within device 100' and/or may be coupled to device 100' via a wired or wireless communication medium.

Communication interface module 210 may be configured to manage packet routing and other control functions for communication module 212, which may include resources configured to support wired and/or wireless communications. In some instances, device 100' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

In the example disclosed in FIG. 2, OS selection agent 110A . . . n' may be configured to interact with at least user interface module 208 and KMC 112' in VMM 104'. VMM 104' may be configured to interact with at least OS selection agent 110A . . . n' and memory module 202. In an example of operation, a user may interact with hardware-based components (e.g., hardware buttons, switches, etc.) or software-based components (e.g., screen buttons, icons, etc.) in user interface module 208 to cause an OS 106A . . . n in the background of device 100' to move to the foreground. At least one OS selection agent 110A . . . n' in an OS 106A . . . n may sense the user interaction with user interface module 202 and may then transmit an instruction to KMC 112'. KMC 112' may then transmit at least one signal (e.g., a virtual power button signal) to kernel 108A . . . n residing in memory module 204 to cause the foreground/background OS transition.

FIG. 3 illustrates an example of dynamic reassignment in accordance with at least one embodiment of the present disclosure. FIG. 3 discloses example operations that may occur when transitioning foreground OS 106A to the background and background OS 106B to the foreground. For example, OS selection agent 110A may sense a transition trigger, and may then transmit a message to KMC 112 in VMM 104 instructing that OS 106B be transitioned to the foreground in device 100. In response to receiving message 300, KMC 112 may then transmit a virtual power button signal to kernel 108A'. The virtual power button may cause device drivers 304A to save a current state of equipment 102 as shown at 306 prior to relinquishing control over equipment 102. Saving the current state of equipment 102 may be customary in accordance with a normal power down procedure. KMC 112 may also transmit a virtual power button signal to kernel 108B' as shown at 308. The transmission of virtual power button signal 308 to kernel 108B' may occur, for example, at substantially the same time as virtual power button signal 302, after a set time delay, after the receipt of virtual power button signal 302 or the release of control over equipment 102 is acknowledged by kernel 108A', etc. Virtual power button 308 may cause device drivers 304B to restore a previously saved state of equipment 102 as shown at 310 and to initiate (or reinitiate) control over equipment 102. Restoring the previously saved state as shown at 310 may comprise restoring settings in device drivers 304B corresponding to the last time that device drivers 304B were controlling equipment 102. Following the restoration of device drivers 304B, OS 106B may begin (or resume) operations in the foreground of device 100 as shown at 312. OS 106A may continue to be active in background of device 100. In particular, OS 106A may still continue to operate in a normal mode to the extent possible without access to equipment 102. Transitions between foreground and background OS 106A . . . n may therefore proceed relatively quickly since background OS 106A . . . n is not totally dormant (e.g., in sleep state).

In one embodiment, KMC 112 may keep track of the foreground and background OS 106A . . . n in order to quickly facilitate changes from foreground to background OS 106A . . . n. Moreover, some device drivers 304A and/or 304B may be shared between OS 106A . . . n. For example, device drivers 304A may act as native drivers (e.g., associated with an Android OS), while device drivers 304B may act as pass-through drivers (e.g., associated with a Windows operating system). If OS 106B is required to access equipment 102 (e.g., access network communication, data storage, etc.), device drivers 304B (e.g., acting as "frontend" drivers) may rely upon device drivers 304A (e.g., acting as "backend" drivers) to facilitate the access.

FIG. 4 illustrates example operations for dynamic reassignment for multi-OS devices in accordance with at least one embodiment of the present disclosure. The example operations shown in FIG. 4 may be from the perspective of a KMC inside of a VMM within a device. In operation 400 a request may be received (e.g., in the KMC from at least one OS selection agent) to replace a foreground OS with a background OS. The receipt of the transition request may cause a signal (e.g., a virtual power button signal) to be transmitted to a foreground kernel (e.g., by the KMC) in operation 402. The virtual power button signal may at least cause device drivers in the foreground kernel to save a current equipment state and release control over the equipment. Another virtual power button signal may then be transmitted to the background OS in operation 404, the second virtual power button causing at least device drivers in the background OS to restore a previously saved equipment and to begin controlling the equipment. As a result of the transmission of the virtual power button signals, the foreground OS may transition to the background and the background OS may transition to the foreground.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to dynamic reassignment for multi-OS devices. An example device may comprise equipment, at least two operating systems, a kernel for each OS to provide an interface between the OS and the equipment and a virtual machine manager (VMM). OS selection agents in each OS may interact with a kernel mode controller (KMC) in the VMM. For example, the OS selection agent may transmit a message instructing the KMC to transition the foreground OS to the background and transition a background OS to the foreground. The KMC may transmit signals to the kernels of the foreground and background operating systems causing at least one driver in the foreground OS kernel to save a current equipment state and release control over the equipment while also causing at least one driver in the background OS kernel to restore an equipment state and to take control over the equipment.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for dynamic reassignment for multi-OS devices, as provided below.

According to example 1 there is provided a multi-operating system device. The device may comprise equipment to support operations in the device, at least two operating systems each including an operating system selection agent, a kernel corresponding to each of the at least two operating systems, the kernels being to facilitate interaction between the equipment and the at least two operating systems and a virtual machine manager comprising at least a kernel mode controller to control an operational state of at least one of the at least two operating systems based on an instruction received from an operating system selection agent.

Example 2 may include the elements of example 1, wherein the at least two operating systems comprise at least a foreground operating system and a background operating system loaded in the device.

Example 3 may include the elements of example 2, wherein at least one operating system selection agent is to sense a trigger to change the foreground operating system, the trigger being generated by at least one of an event, a command, a hardware-based user interface or a software-based user interface.

Example 4 may include the elements of example 3, wherein the hardware-based user interface comprises at least a hardware button.

Example 5 may include the elements of any of examples 3 to 4, wherein the at least one operating system selection agent is further to transmit an instruction to at least the kernel mode controller to cause the foreground operating system to transition to the background and the background operating system to transition to the foreground.

Example 6 may include the elements of any of examples 2 to 4, wherein at least one operating system selection agent is to sense a trigger to change the foreground operating system, the trigger being generated by at least one of an event, a command, a hardware-based user interface or a software-based user interface and transmit an instruction to at least the kernel mode controller to cause the foreground operating system to transition to the background and the background operating system to transition to the foreground.

Example 7 may include the elements of any of examples 2 to 4, wherein the kernel mode controller being to control the operational state comprises the kernel mode controller being to transmit a signal to at least one kernel.

Example 8 may include the elements of example 7, wherein the signal is a virtual power button signal.

Example 9 may include the elements of example 7, wherein the kernel corresponding to the foreground operating system comprises at least one driver, the kernel corresponding to the foreground operating system being to, upon receiving the signal, cause the at least one driver to save a current equipment state and to release control over the equipment.

Example 10 may include the elements of example 9, wherein the kernel corresponding to the foreground operating system is further to cause the foreground operating system to remain active in the background.

Example 11 may include the elements of example 9, wherein the kernel mode controller is further to transmit a first signal to the foreground operating system and a second signal to the background operating system.

Example 12 may include the elements of example 11, wherein the kernel mode controller is further to transmit the second signal after at least one of a delay after transmitting the first signal or after receiving a confirmation that the foreground operating system has released control over the equipment.

Example 13 may include the elements of example 7, wherein the kernel corresponding to the foreground operating system comprises at least one driver, the kernel corresponding to the foreground operating system being to, upon receiving the signal cause the at least one driver to save a current equipment state and to release control over the equipment and cause the foreground operating system to remain active in the background.

Example 14 may include the elements of example 7, wherein the kernel corresponding to the background operating system comprises at least one driver, the kernel corresponding to the background operating system being to, upon receiving the signal, cause the at least one driver to restore a saved equipment state and to control the equipment.

Example 15 may include the elements of example 14, wherein the kernel corresponding to the background operating system is further to cause the background operating system to move to the foreground.

Example 16 may include the elements of example 7, wherein the kernel corresponding to the background operating system comprises at least one driver, the kernel corresponding to the background operating system being to, upon receiving the signal cause the at least one driver to restore a saved equipment state and to control the equipment and cause the background operating system to move to the foreground.

Example 17 may include the elements of any of examples 1 to 4, wherein at least one kernel comprises a driver shared by the at least two operating systems for accessing the equipment.

According to example 18 there is provided a method for moving between multiple operating systems on a device. The method may comprise receiving a request to transition from a foreground operating system to a background operating system in a virtual machine manager comprising at least a kernel mode controller, transmitting a signal from the kernel mode controller to a kernel corresponding to the foreground operating system to cause the foreground operating system to deactivate and transmitting a signal from the kernel mode controller to a kernel corresponding to the foreground operating system to cause the background operating system to activate.

Example 19 may include the elements of example 18, wherein the signal is a virtual power button signal.

Example 20 may include the elements of any of examples 18 to 19, any may further comprise receiving the signal in the kernel corresponding to the foreground operating system, causing at least one driver in the kernel to save a current state of equipment in the device being controlled by the driver and causing the at least one driver to release control over the equipment.

Example 21 may include the elements of example 20, and may further comprise causing the foreground operating system to remain active in the background.

Example 22 may include the elements of example 20, and may further comprise delaying prior to transmitting the signal from the kernel mode controller to the kernel corresponding to the background operating system, the delay being based on at least one of a duration of time after transmitting the signal to the kernel corresponding to the foreground operating system or after receiving a confirmation that the foreground operating system has released control over the equipment.

Example 23 may include the elements of any of examples 18 to 19, and may further comprise receiving the signal in the kernel corresponding to the foreground operating system, causing at least one driver in the kernel to save a current state of equipment in the device being controlled by the driver, causing the at least one driver to release control over the equipment and causing the foreground operating system to remain active in the background.

Example 24 may include the elements of any of examples 18 to 19, and may further comprise receiving the signal in the kernel corresponding to the background operating system, causing at least one driver in the kernel to save a current state of equipment in the device being controlled by the driver and causing the at least one driver to control the equipment.

Example 25 may include the elements of example 24, and may further comprise causing the background operating system to move to the foreground.

Example 26 may include the elements of any of examples 18 to 19, and further comprises receiving the signal in the kernel corresponding to the background operating system, causing at least one driver in the kernel to save a current state of equipment in the device being controlled by the driver, causing the at least one driver to control the equipment and causing the background operating system to move to the foreground.

According to example 27 there is provided a system including at least a device, the system being arranged to perform the method of any of the above examples 18 to 26.

According to example 28 there is provided a chipset arranged to perform the method of any of the above examples 18 to 26.

According to example 29 there is provided at least one machine readable medium comprising a plurality of instructions that, in response to be being executed on a computing device, cause the computing device to carry out the method according to any of the above examples 18 to 26.

According to example 30 there is provided a device configured for dynamic reassignment for multi-OS devices, the device being arranged to perform the method of any of the above examples 18 to 26.

According to example 31 there is provided a system for moving between multiple operating systems on a device. The system may comprise means for receiving a request to transition from a foreground operating system to a background operating system in a virtual machine manager comprising at least a kernel mode controller, means for transmitting a signal from the kernel mode controller to a kernel corresponding to the foreground operating system to cause the foreground operating system to deactivate and means for transmitting a signal from the kernel mode controller to a kernel corresponding to the foreground operating system to cause the background operating system to activate.

Example 32 may include the elements of example, wherein the signal is a virtual power button signal.

Example 33 may include the elements of any of examples 31 to 32, and may further comprise means for receiving the signal in the kernel corresponding to the foreground operating system, means for causing at least one driver in the kernel to save a current state of equipment in the device being controlled by the driver and means for causing the at least one driver to release control over the equipment.

Example 34 may include the elements of example 33, and may further comprise means for causing the foreground operating system to remain active in the background.

Example 35 may include the elements of any of examples 31 to 32, and may further comprise means for receiving the signal in the kernel corresponding to the background operating system, means for causing at least one driver in the kernel to save a current state of equipment in the device being controlled by the driver and means for causing the at least one driver to control the equipment.

Example 36 may include the elements of example 35, and may further comprise means for causing the background operating system to move to the foreground.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A multi-operating system device, comprising:
user interface equipment to support operations in the device, wherein the user interface equipment includes at least one of hardware coupled to the device or hardware within the device;
a first operating system and a first operating system selection agent, the first operating system selection agent to transmit a first instruction;
a second operating system and a second operating system selection agent, the second operating system selection agent to transmit a second instruction;
a virtual machine manager to manage access to the user interface equipment, the virtual machine manager including:
a kernel mode controller to monitor each of the operating systems and control whether each of the operating systems is to be a foreground operating system or a background operating system based on receipt of the first or second instruction from the first or second operating system selection agent;
a first kernel corresponding to the first operating system, the first kernel having a shared driver to control the user interface equipment via the virtual machine manager while the first operating system is the foreground operating system; and
a second kernel corresponding to the second operating system, the second kernel having access to the shared driver to control the user interface equipment via the virtual machine manager while the second operating system is the foreground operating system; and
wherein:
upon receiving the first or second instruction, the kernel mode controller is to transmit a signal to at least one of the first kernel or the second kernel;
upon receiving the signal from the kernel mode controller, the first kernel is to:
cause the shared driver to save a current equipment state and release control over the user interface equipment from the first operating system; and
move the first operating system from the foreground to the background, wherein the first operating system remains active in the background; and
upon receiving the signal from the kernel mode controller, the second kernel is to:
cause the shared driver to load the saved current equipment state and grant control over the user interface equipment to the second operating system; and
move the second operating system to the foreground.

2. The device of claim 1, wherein the first or second operating system selection agent is to sense a trigger to change the foreground operating system, the trigger being generated by at least one of an event, a command, a hardware-based user interface or a software-based user interface.

3. The device of claim 2, wherein the first or second operating system selection agent is further to transmit the first or second instruction to at least the kernel mode controller to cause the foreground operating system to transition to the background and the background operating system to transition to the foreground in response to sensing the trigger.

4. The device of claim 1, wherein the kernel mode controller being to control whether each of operating systems is to be a foreground operating system or a background operating system comprises the kernel mode controller being to transmit a signal to at least one of the first kernel or the second kernel.

5. The device of claim 4, wherein the signal is a virtual power button signal.

6. A method for moving between multiple operating systems on a device, comprising:
managing access to user interface equipment via a virtual machine manager, the virtual machine manager including at least a kernel mode controller;
monitoring a first operating system and a second operating system by the kernel mode controller;
receiving, by the kernel mode controller, an instruction from an operating system selection agent executed by one of the operating systems to transition from a foreground operating system to a background operating system;
controlling, via the kernel mode controller, whether each of the operating systems is to be a foreground operating system or a background operating system based on the received instruction;
transmitting a first signal from the kernel mode controller to a first kernel having access to a shared driver to cause the shared driver to:
save a current equipment state; and
release control over the user interface equipment, wherein the first kernel executes the first operating system;
in response to transmitting the first signal, transmitting a second signal from the kernel mode controller to a second kernel having access to the shared driver to cause the shared driver to:
load the saved current equipment state; and
control the user interface equipment, wherein the background kernel executes the background operating system;
causing the first operating system to transition to the background; and
causing the first operating system to remain active in the background.

7. The method of claim 6, wherein the first and second signals include a virtual power button signal.

8. The method of claim 6, further comprising:
receiving the first signal in the first kernel; and
responsive to receiving the first signal in the first kernel:
causing the shared driver to save a current state of the equipment in the user interface equipment; and
causing the shared driver to release control over the user interface equipment.

9. The method of claim 6, further comprising:
receiving the second signal in the second kernel; and
responsive to receiving the second signal in the second kernel:
causing the shared driver to load the saved current state of the user interface equipment; and
causing the shared driver to control the user interface equipment.

10. The method of claim 9, further comprising:
causing the second operating system to move to the foreground.

11. One or more non-transitory machine-readable memories having stored thereon, individually or in combination, instructions that when executed by one or more processors result in the following operations for moving between multiple operating systems on a device, comprising:

manage access to user interface equipment via a virtual machine manager, the virtual machine manager including at least a kernel mode controller;

monitor a first operating system and a second operating system by the kernel mode controller;

receive, by the kernel mode controller, an instruction from an operating system selection agent executed by one of the operating systems to transition from a foreground operating system to a background operating system in a virtual machine manager comprising at least a kernel mode controller;

control whether each of the operating systems is to be a foreground operating system or a background operating system based on the received instruction;

cause a first signal to be transmitted from the kernel mode controller to a first kernel having access to a shared driver to cause the shared driver to:
save a current equipment state; and
release control over the user interface equipment, wherein the first kernel executes the first operating system;

cause a second signal to be transmitted from the kernel mode controller to a second kernel having access to the shared driver to cause the shared driver to:
load the saved current equipment state; and
control the user interface equipment, wherein the second kernel executes the second operating system;

cause the first operating system to transition to the background; and cause the first operating system to remain active in the background.

12. The one or more non-transitory machine-readable memories of claim 11, wherein the first and second signals include a virtual power button signal.

13. The one or more non-transitory machine-readable memories of claim 11, further comprising instructions that when executed by one or more processors result in the following operations, comprising:

receive the first signal in the first kernel; and responsive to receiving the first signal in the first kernel:
cause the shared driver to save a current state of the equipment in the user interface equipment; and
cause the shared driver to release control over the user interface equipment.

14. The one or more non-transitory machine-readable memories of claim 11, further comprising instructions that when executed by one or more processors result in the following operations, comprising:

receive the second signal in the second kernel; and responsive to receiving the second signal in the second kernel:
cause the shared driver to load the saved current state of the user interface equipment; and
cause the at least one background driver to control the equipment.

15. The one or more non-transitory machine-readable memories of claim 14, further comprising instructions that when executed by one or more processors result in the following operations, comprising:

cause the second operating system to move to the foreground.

* * * * *